Feb. 9, 1960  A. PINSON  2,924,468
RAIL END COUPLING DEVICE
Filed Aug. 31, 1955
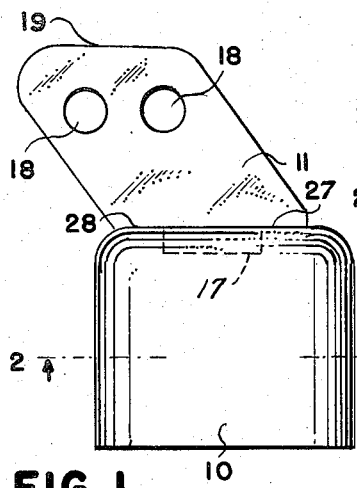
FIG. 1.
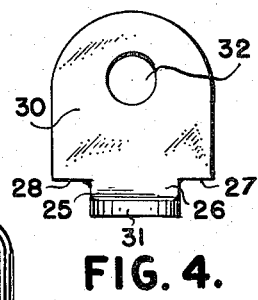
FIG. 4.
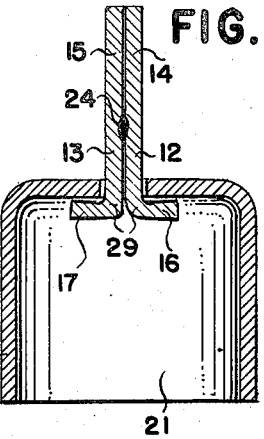
FIG. 3.
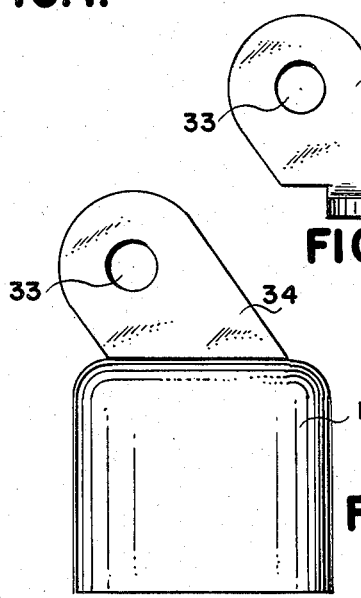
FIG. 8.
FIG. 7.
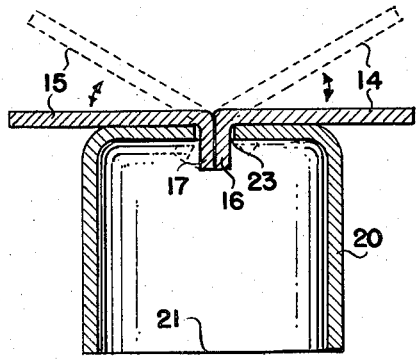
FIG. 5.
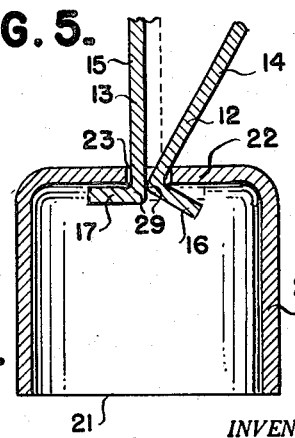
FIG. 6.
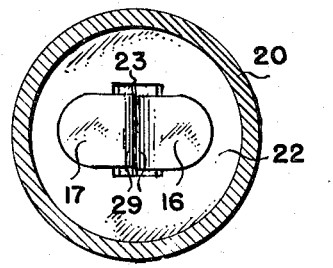
FIG. 2.
INVENTOR.
ABRAHAM PINSON
BY Abraham Friedman
Atty.

United States Patent Office 2,924,468
Patented Feb. 9, 1960

2,924,468

RAIL END COUPLING DEVICE

Abraham Pinson, Brooklyn, N.Y.

Application August 31, 1955, Serial No. 531,726

1 Claim. (Cl. 287—20.5)

This invention relates to improvements in rail ends, coupling devices and the fabrication thereof.

Rail ends are couplings which are generally used in metallic fence construction to provide a rigid interconnection between the horizontal members or rails and the vertical members or posts. The conventional type of rail end comprises a sleeve fitting member, which fits over the end of the rail and is secured thereon by conventional means, such as setscrews, and a plate which extends generally axially from a transverse wall of the sleeve fitting and which is centrally perforated. The plate is used to effect a connection with a clevis or the like, which is mounted on the fence post or vertical member.

In conventional fabrication processes rail ends are generally formed of homogeneous castings or of stamped steel components wherein the plate component is rigidly secured to the sleeve fitting component by welding. The casting method of fabrication, in addition to being relatively expensive, provides a brittle structure prone to breakage. Although the stamped steel components are themselves structurally adequate, the tensile strength of the welded assembly is solely dependent upon the strength of the welded joint connecting the components.

The instant invention provides a structurally superior rail end formed from stamped steel components particularly adapted for economic fabrication by mass-production techniques. The general appearance of this novel rail end is similar to the above-described conventional type, excepting that the plate includes a flange, which in the finished structure, is disposed against the inner surface of the transverse wall of the sleeve fitting. The assembly is made by inserting two symmetrical plates having oppositely extending transverse legs or flanges through a slot in the sleeve-fitting transverse wall and then welding the plates together in position on the sleeve fitting. Thus tensile stresses are resisted by the plate legs (comprising the flanges) bearing against the transverse wall in addition to the welding. Consequently without involving additional appreciable fabrication expenses, a rail end is provided with structural qualities far superior to the afore-mentioned conventional forms.

Consequently it is the primary object to provide a rail end of superior structural qualities which involves inexpensive fabrication methods.

Another inventive object is the provision of a rail end formed from stamped steel components secured rigidly in position by a single spot-welding operation wherein the strength of the joint arises from the abutting portions of the components and is further reinforced by a weld.

A further inventive object is the provision of an inexpensively fabricated rail end formed from a plurality of stamped steel components, wherein the components include interlocking portions both increasing the strength of the joint and providing abutting surfaces disposed to resist tensile and flexural stresses.

A still further inventive object is the provision of an inexpensively fabricated rail end coupling device formed from components initially separable and maneuverable to an interlocking position for the purposes of convenient assembly to provide a rigid interconnection between the components wherein the components include coacting portions in abutment with each other and secured to each other by a spot weld for the purpose of resisting stresses.

A still further inventive object is the provision of a process for forming economically a rail-end-coupling device of superior structural qualities.

A still further inventive object is the provision of a process for inexpensively fabricating a rail end of superior structural qualities wherein a plurality of stamped steel components are arranged in a predetermined position and locked in position by a single spot weld.

A still further inventive object is the provision of a process for inexpensively fabricating a rail end wherein a pair of plate fitting elements are mounted transversely on the end wall of a sleeve fitting member by moving the plate elements from a position permitting initial engagement between the sleeve fitting and each plate fitting, to an assembled position wherein the plate elements are in substantial parallel abutment and in interlocking engagement with said wall, welding the plates to each other and finally dipping the entire assembly in a galvanizing bath thereby providing a corrosion-resisting surface and also filling voids between the abutting surfaces of the plates and sleeve fitting.

Further inventive objects and novel structure will become more apparent from the following detailed description, appended claim and attached drawings in which:

Figure 1 is an elevation of the novel coupling;

Figure 2 is a transverse section through the sleeve fitting showing the relationship between the plate fitting elements and the sleeve fitting, as viewed from plane 2—2 of Figure 1;

Figure 3 is a longitudinal section along a principal plane at right angles to that of Figure 2 showing the symmetrically disposed plate fitting elements as in the assembled position;

Figure 4 is an elevation of a modified plate fitting element, per se;

Figure 5 is a longitudinal sectional view of the coupling components showing the initial positions of the components in forming an assembly;

Figure 6 is a similar view showing a subsequent position just prior to the final assembled position;

Figure 7 is an elevation of an assembled coupling incorporating a further plate fitting element embodiment; and Figure 8 is an elevation of a plate fitting element of Figure 7 per se.

Referring to Figure 1, an assembled embodiment of the novel rail-end construction is seen to comprise a cup-like sleeve fitting member 10, which is adapted for mounting on the end of a fence rail, and a plate fitting member 11, adapted for interconnection with a clevis (not shown) or the like which is mounted on a post or vertical member (not shown). The plate embodiment of Figure 1 comprises two complementary L-shaped elements 12 and 13 having webs 14 and 15, which terminate in a restricted neck portion 25 and 26 thus forming shoulders 27 and 28. Transverse flanges 16 and 17 project from one side of each of ends 29 of the neck portions of the webs (see Figure 3). Each of the webs include spaced circular perforations 18 having a common principal axis spaced from and parallel to the outer ends 19 of the webs 14 and 15 for the purposes of receiving therethrough a bolt, screw, pin or the like (not shown). The longitudinal axes of the webs 14 and 15 are each respectively inclined to the flanges 16 and 17 thereby causing the perforations 18 to be eccentric relative to the axis of the sleeve fitting 10. Thus the eccentricity of the perforations relative to the sleeve fitting in the embodiment of Figure 1 provides means for effecting an offset connection between a rail and fence-post clevis. The need for offset connecting means between rails and posts frequently occurs in metallic-fence construction.

The sleeve fitting 10 comprises a cylindrical wall 20 having an outer open end 21 and an inner end closed by a transverse wall 22. The transverse wall 22 includes a central rectangular opening 23 for the purposes of receiving therethrough the neck and flange portions of the plate fitting elements.

To effect an assembly the flanges 16 and 17 (see Figure 5) are placed in parallel abutment and inserted through opening 23 until the webs 12 and 13 abut the outer surface of wall 22. The opening 23 is of sufficient length and width to accommodate the neck and flange portions with a slight clearance therebetween. At the juncture 29 between the neck portion of the webs and the respective flanges circular fillets are provided to facilitate rotating the plate fittings from the initial position of Figure 5 to the final position of Figure 3. In Figure 6 one of the plate fitting elements 12 is shown in an intermediate position illustrating the function of the circular transition fillets in facilitating the rotation of the plate fittings from the initial to final positions.

When the plate fitting elements 12 and 13 are in the final or assembled position of Figure 3, a substantial portion of the oppositely extending flanges 17 and 16 are parallel to and in abutment with the inside surface of wall 22. The shoulders 27 and 28 rest upon the outer surface of said wall 22 whereby movement of said plate elements in the direction of the longitudinal axis of the sleeve is prevented, the transverse wall of the fitting resting between the shoulders and flanges. To complete the assembly the webs 14 and 15 are pressed into close contact and a single transverse spot weld 24 is adequate to firmly and securely lock the sleeve and plate fittings in position. The pressure of the spot-welding electrodes is advantageously employed to draw the webs 14 and 15 together into the desired close surface contact. Finally the entire assembly is immersed in a galvanizing bath which provides two functions. Firstly, the exposed surfaces are completely coated with a noncorrosive skin and secondly, voids resulting from malalignment, material imperfections and variations in the thickness of the material or in their shape or dimensions arising in the course of manufacture are compensated for, thereby augmenting structural qualities of the finished product. Thus any play between the sleeve and plate fittings is completely eliminated by the galvanizing metal dip.

It should be particularly noted that the flanges 16 and 17 are effective in resisting flexural and tensile stresses tending to displace the plate fitting relative to transverse wall 22. Tensile stresses tending to pull the plate fitting axially away from the wall 22 induce full bearing contact between the flanges and the wall which will substantially develop the full strength of the webs in tension. The welding additionally reinforces the structure. In the conventional forms which do not include flanges such as 16 and 17 the tensile stresses were resisted entirely by the weld acting in shear. Thus it would be improbable that the full strength of the webs in tension could be developed.

The necks and flanges are also effective in resisting transverse forces acting on the plate fitting. Such transverse forces set up couples which induce bearing stresses between the wall 22 and the necks and flange areas. The effect of the neck and flanges in resisting stresses induced by exterior couples is especially pertinent in the embodiment of Figure 1 wherein the perforations are eccentric relative to the axis of the sleeve 10. Tensile stresses are imposed upon this rail end by an axial force acting on the sleeve and an opposing eccentric force parallel to the axial force acting approximately midway between the perforations 18. Due to the eccentric relationship between these forces a couple is generated tending to rotate the plate axis into axial alignment with the sleeve 10, thereby inducing a resisting couple provided between the neck and flanges and the transverse wall 22 as heretofore described in relation to external couples in general. Thus since the rail end of Figure 1 will always be subjected to flexural stresses, it is of extreme importance in this type of rail end to provide means for fully resisting these stresses, for improving the structural qualities of conventional rail ends.

It is now apparent that the improvement in the finished rail-end product resides substantially in the provision of a flange abutting the inner surface of the transverse wall 22 to generate reactions resisting external stresses tending to separate or distort the plate fittings relative to the sleeve fitting. There can be no doubt as to the superiority of this type of structure over the conventional type wherein the plate fittings are merely welded to the surface of the transverse wall. The sleeve and plate fitting structure in addition to forming a rail end coupling of superior structural qualities permits the utilization of efficient, economical mass production techniques. There is a material decrease in the labor and expense involved in assembling the instant rail-end embodiment over the conventional type. For example the operation involved in placing and holding the conventional plate fitting accurately in alignment and position with the sleeve-fitting axis requires an effort considerably greater than the effort required to mount the plate fitting elements in the opening 23 of the transverse wall 22. The perforation 23 in transverse wall 22 serves to align and hold the plate fitting for the reception of the weld.

In Figure 4 another plate-fitting embodiment is shown wherein the longitudinal axis of the web 30 is at right angles to the plane of the flange 31, and the hole 32 is in alignment with the web axis. Obviously this form of fitting is intended for use in situations where the axis of the rail is in alignment with the connecting means mounted on the post.

The plate-fitting embodiment of Figure 8 is of the offset variety discussed in connection with Figure 1. However only one hole 33 is provided along the inclined axis of the web 34. The inclination is approximately 45°; although the degree of inclination can be varied as required by the particiular structure involved.

In Figure 7 the plate-fitting embodiment of Figure 8 is incorporated in an assembled rail end to provide an offset coupling structure adapted to receive a single bolt, screw, pin or the like. The embodiment of Figure 1 is adapted to receive a pair of pins, bolts, etc. to effect a connection with a fence-post clevis or the like.

Although the desired device is mainly intended for use as a rail end, it should be noted that the sleeve fitting can be mounted over the top of a post (vertical member) and the plate fittings be adapted to support horizontal rods, pipes, cables or wire.

For example the perforations through the plate fittings in the Figures 1, 4 and 8 are adapted to receive in supporting fashion transverse pipes, rods, wire, etc. The size of the plate fittings and openings may be enlarged or varied in accordance with the requirements of the associated device.

From the foregoing description it is now evident that a novel process is disclosed for producing a rail end of superior characteristics involving the connection of stamped steel components which are especially adapted for convenient interconnection prior to the welding operation. Furthermore the product resulting from this process comprises a novel structure adapted to withstand the normally anticipated stresses in a manner superior to known products of this type. It should also be noted that the plate-fitting elements may be secured by bolts or rivets in place of the weld.

It should be further understood that, although the embodiments disclosed herein are preferred forms, the many modifications of these embodiments attainable by skilled mechanics, are obviously within the scope of this invention.

I claim:
A rail end coupling for joining a rail to a post, said coupling comprising a cuplike fitting having a cylindrical wall and a transverse inner wall, the cylindrical wall being adapted for mounting at the end of a rail, and a plate fitting comprising a pair of complementary L-shaped elements, each having a web portion and a transverse flange, said web portion terminating in a restricted neck portion to form outwardly extending shoulders therebetween, said inner wall including an opening adapted to simultaneously receive said flanges, said L-shaped elements being rotatable from a position wherein the flanges project axially through the opening to another position wherein the flanges are in parallel abutment with the inner wall, and wherein said shoulders overlie said inner wall, and means for retaining said elements in said last-named position.

References Cited in the file of this patent

UNITED STATES PATENTS

| | | |
|---|---|---|
| 367,974 | Hanson | Aug. 9, 1887 |
| 425,926 | Beers et al. | Apr. 15, 1890 |
| 666,236 | Parter et al. | Jan. 15, 1901 |
| 1,483,311 | O'Brien | Feb. 12, 1924 |
| 1,837,354 | Boller | Dec. 22, 1931 |
| 2,674,476 | Grosso | Apr. 6, 1954 |
| 2,807,834 | Blum | Oct. 1, 1957 |

FOREIGN PATENTS

| | | |
|---|---|---|
| 364,805 | Great Britain | Jan. 14, 1932 |
| 434,369 | Italy | Apr. 26, 1948 |
| 773,310 | France | Aug. 27, 1934 |